Jan. 10, 1928.
E. E. UNDERWOOD
CAMERA BACK LATCH
Filed Aug. 3, 1925
1,655,525
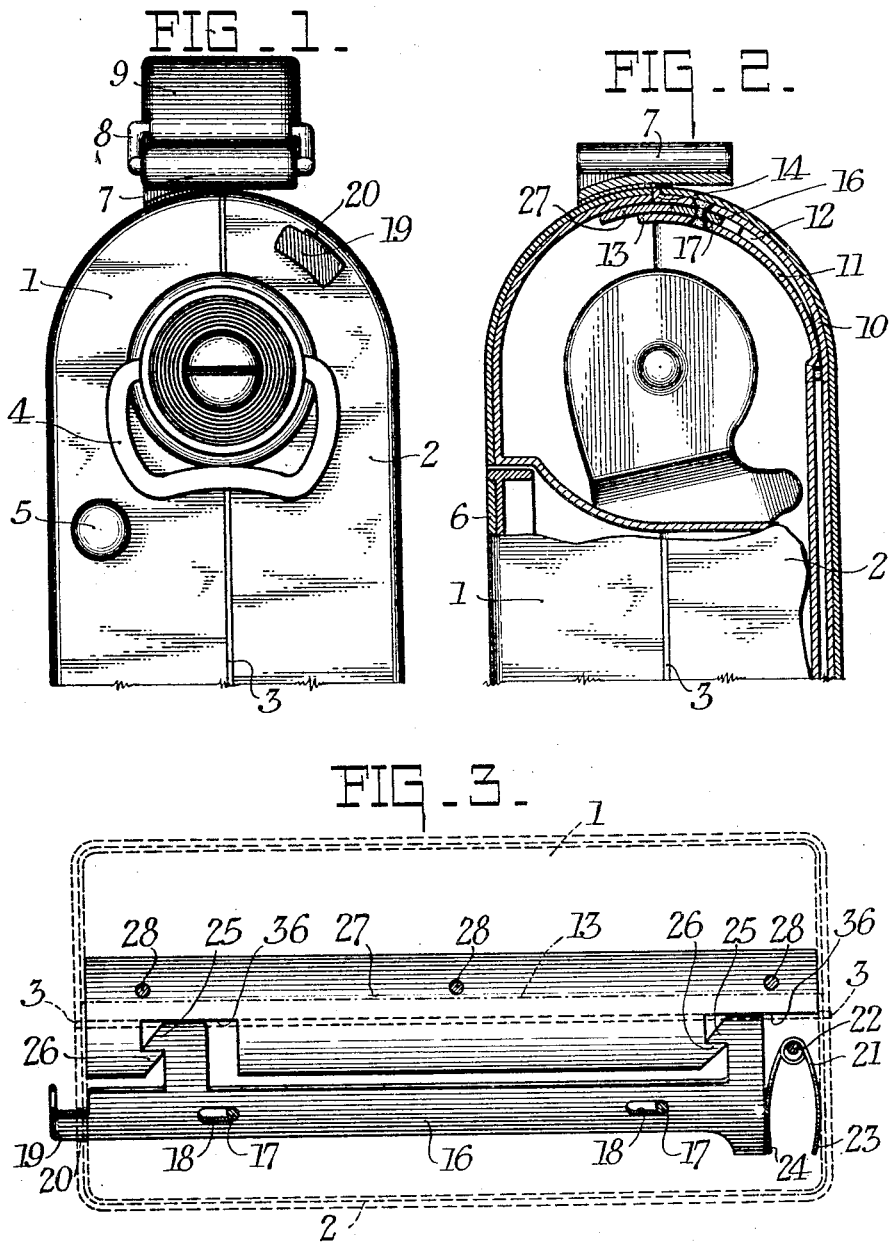
INVENTOR.
Ernest E. Underwood,
BY
ATTORNEYS.

Patented Jan. 10, 1928.

1,655,525

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

CAMERA-BACK LATCH.

Application filed August 3, 1925. Serial No. 47,989.

This invention relates to photography, and more particularly to cameras. One object of my invention is to provide a latch for holding a camera back on a camera body. Another object is to provide a camera in which the latch mechanism, with the exception of the operating member, is concealed inside of the camera case. Another object is to provide a camera latch in which the interengaging parts are guided into their operative or latching position. Another object is to utilize a light trapping flange for one element of the camera latch. Another object is to provide a latching mechanism in which one latch member is confined between two plates so that this member may be made of relatively light weight material; and other objects will appear from the following specification, the novel features being pointed out in the claim at the end thereof.

Coming now to the drawings, wherein like reference characters denote like parts throughout,—

Fig. 1 is a fragmentary side elevation of a camera constructed in accordance with, and embodying one form of my invention;

Fig. 2 is a side section through the camera shown in Fig. 1; and

Fig. 3 is a top plan view of the camera latch mechanism, the camera parts being shown in broken lines.

While my latch is adapted for use on a number of different types of cameras, it is particularly suitable for cameras of the type shown in U. S. Patent No. 1,504,485, issued August 12, 1924, to Robert Kroedel for camera backs. I will describe its application to a camera of this type.

The camera consists of a body portion 1 having a removable back 2 which may join the camera body on a line 3 drawn through the center of the camera. It may have the usual winding key 4 and a push button 5 by which the bed 6 may be released. A bracket 7 supports the yokes 8 by which the handle 9 may be carried. For further details, reference may be had to the patent above cited.

As shown in Fig. 2, the camera back 2 is made of a pair of nested plates 10 and 11, these plates beign spaced at 12 so that their ends 13 and 14 will provide a slot for receiving a light trapping plate 27, to be hereinafter described. A latch member 16 is mounted to slide upon the studs 17 which pass through the walls 13 and 14 of the camera back. These studs also pass through the slots 18 in the latching bar, and there is an extension 19 which forms an operating handle for the bar after it passes out through an opening 20 in a wall of the camera casing.

A spring 21, encircling a stud 22, is provided with two arms, one of which 23 rests against the camera wall, and the other arm 24 rests against the sliding bar 16. Since the space between the walls 13 and 14 confines the sliding bar to a definite path, the spring will always rest against the end of the bar tending to thrust it into its operative or latching position, as shown in Fig. 3.

Member 16 is provided with a pair of hooks 25 which are adapted to engage a pair of complementary hooks 26 forming a part of a latching member 27. This member is preferably attached to the camera body 1 by means of rivets 28, and since it extends across the entire width of the camera casing and into the slot between plates 13 and 14 it forms a light-tight connection between the camera body and back, as well as a part of the latching mechanism. It should be noted from Fig. 3, that the end 13 of plate 11 extends well beyond the edges 36 of the cut-out formed for clearance of hooks 25, so that as the metal members 13 and 27 overlap, a perfectly safe light-tight joint is thus formed.

The operation of this latch is as follows: In order to open the camera, the handle 19 is depressed moving bar 16 upon studs 17 against the action of spring 21. This releases the hooks 25 from hooks 26 and the back 2 may be removed from the camera 1. The camera back may be placed on the camera and pressed towards the body, thus causing the two hooks to snap into a locking position. Plate 13 forms a guideway which directs member 27 into the slot 12 in which latching bar 16 is mounted.

It should be noted that this latch utilizes the spacing between plates 13 and 14 for a housing for the slidable latch member and its operating spring. Such construction makes a neat camera, since it reduces the outside projections on the camera to a minimum. The ends 13 and 14 of plates 12 and 13 form a slideway which confines the latching members to a fixed path and which prevents the latching members from being bent or otherwise injured. Since the aperture 20 in the camera wall lies between plates 13 and 14 a light trap is provided for the latch operating handle.

Having thus described my invention, what I claim as new and desire to secure by Letters Patent is:

In combination, a two part camera including a camera body and camera back having curved walls, one part having a curved flange member and the other part having a double curved wall portion adapted to receive the curved flange member whereby a light guard structure is provided, hook members provided on the curved flange light guard member, and a movable curved latch member mounted between the curved double walls, hook engaging members on said curved latch member, means on the outside of the camera casing for operating the latch member whereby the camera body and back may be moved to and from an operative position in which they are latched together.

Signed at Rochester, New York this 29th day of July, 1925.

ERNEST E. UNDERWOOD.